United States Patent
Gaur et al.

(10) Patent No.: US 12,233,376 B2
(45) Date of Patent: Feb. 25, 2025

(54) SURFACE-MODIFIED CARBON AND SORBENTS FOR IMPROVED EFFICIENCY IN REMOVAL OF GASEOUS CONTAMINANTS

(71) Applicant: Columbus Industries, Inc., Ashville, OH (US)

(72) Inventors: Vivekanand Gaur, Dublin, OH (US); Eric Pontious, Circleville, OH (US)

(73) Assignee: Columbus Industries, Inc., El Paso, TX (US)

(*) Notice: Subject to any disclaimer, the term of this patent is extended or adjusted under 35 U.S.C. 154(b) by 215 days.

(21) Appl. No.: 17/087,716

(22) Filed: Nov. 3, 2020

(65) Prior Publication Data

US 2021/0046417 A1 Feb. 18, 2021

Related U.S. Application Data

(62) Division of application No. 15/802,971, filed on Nov. 3, 2017, now abandoned.

(Continued)

(51) Int. Cl.
*B01D 53/02* (2006.01)
*B01D 53/72* (2006.01)
(Continued)

(52) U.S. Cl.
CPC .............. *B01D 53/02* (2013.01); *B01D 53/72* (2013.01); *B01D 53/8668* (2013.01);
(Continued)

(58) Field of Classification Search
CPC ..................... B01J 20/28026; B01J 20/0222
See application file for complete search history.

(56) References Cited

U.S. PATENT DOCUMENTS 5,997,829 A * 12/1999 Sekine ................... B01D 53/02
423/230
5,998,328 A 12/1999 Dawes et al.
(Continued)

FOREIGN PATENT DOCUMENTS

CN 102198405 A 9/2011
CN 201310139928.3 3/2013
(Continued)

OTHER PUBLICATIONS

Ren 'Functionalization of Biomass Carbonaceous Aerogels: Selective Preparation of MnO2@CA Composites for Supercapacitors' in Applied Materials & Interfaces vol. 6 pp. 9689-9697 (2014). (Year: 2014).*

(Continued)

*Primary Examiner* — Stuart L Hendrickson
(74) *Attorney, Agent, or Firm* — Jason H. Foster; Kremblas & Foster

(57) ABSTRACT

A material, and filters and other structures exposed to flowing gas that have the material therein, which removes VOCs, such as formaldehyde, from the gas. The material is a porous sorbent impregnated by a metal oxide, such as manganese oxide (MnOx) nano particles. The sorbent may be activated carbon, and the manganese oxide may catalyze formaldehyde to water and carbon dioxide while the carbon may adsorb formaldehyde, both mechanisms of which remove the VOC from the air to prevent or reduce inhalation of the same by humans. The material may be combined with an untreated sorbent or sorbent treated with ionic alkaline salts.

11 Claims, 4 Drawing Sheets

Related U.S. Application Data

(60) Provisional application No. 62/463,144, filed on Feb. 24, 2017, provisional application No. 62/422,943, filed on Nov. 16, 2016, provisional application No. 62/416,899, filed on Nov. 3, 2016.

(51) Int. Cl.
    *B01D 53/86*     (2006.01)
    *B01J 20/02*     (2006.01)
    *B01J 20/28*     (2006.01)
    *B01J 20/32*     (2006.01)

(52) U.S. Cl.
CPC ..... *B01J 20/0222* (2013.01); *B01J 20/28004* (2013.01); *B01J 20/28023* (2013.01); *B01J 20/3236* (2013.01); *B01J 20/3238* (2013.01); *B01J 20/324* (2013.01); *B01D 2101/02* (2013.01); *B01D 2253/102* (2013.01); *B01D 2253/25* (2013.01); *B01D 2255/2073* (2013.01); *B01D 2257/708* (2013.01); *B01D 2258/06* (2013.01); *B01D 2259/4508* (2013.01); *Y02A 50/20* (2018.01)

(56) References Cited

U.S. PATENT DOCUMENTS

| | | | |
|---|---|---|---|
| 6,010,666 A * | 1/2000 | Kurokawa | B01D 53/8606 502/344 |
| 6,319,484 B1 | 11/2001 | Shore et al. | |
| 6,458,741 B1 | 10/2002 | Roark et al. | |
| 7,256,156 B2 | 8/2007 | Axtell et al. | |
| 7,378,372 B2 | 5/2008 | Sylvester | |
| 8,664,153 B1 | 3/2014 | Ahumada | |
| 8,691,722 B2 | 4/2014 | Gadkaree et al. | |
| 8,795,588 B2 | 8/2014 | Dardas et al. | |
| 9,138,669 B2 | 9/2015 | Leung et al. | |
| 9,302,255 B2 | 4/2016 | Kanna et al. | |
| 9,427,728 B2 | 8/2016 | Sidheswaran et al. | |
| 2007/0080115 A1 | 4/2007 | Sylvester | |
| 2008/0236389 A1 | 10/2008 | Leedy et al. | |
| 2010/0021366 A1 * | 1/2010 | Hu | B01J 37/0018 423/445 R |
| 2013/0280151 A1 | 10/2013 | Lee et al. | |
| 2014/0255283 A1 | 9/2014 | Sidheswaran et al. | |
| 2016/0214085 A1 | 7/2016 | Hingorani et al. | |

FOREIGN PATENT DOCUMENTS

| | | |
|---|---|---|
| CN | 201410068660 | 2/2014 |
| CN | 201410455990.8 | 9/2014 |
| CN | 104338528 A | 11/2015 |
| CN | 105727737 A | 6/2016 |
| GB | 1104993 | 3/1965 |
| JP | H03-288545 A | 12/1991 |
| JP | H05-064654 A | 3/1993 |
| JP | H06-339629 A | 12/1994 |
| JP | 2001170150 A | 6/2001 |
| JP | 2009-082888 A | 4/2009 |
| JP | 2010063963 A | 3/2010 |
| JP | 2010274178 A | 12/2010 |
| JP | 2011104529 A | 6/2011 |
| JP | 2015-509832 A | 7/2013 |
| KR | 970703173 A | 7/1997 |
| KR | 19990021991 A | 3/1999 |
| KR | 10-0235113 | 12/1999 |
| KR | 100509853 B1 | 8/2005 |
| WO | 2007/072739 A1 | 6/2007 |
| WO | 2007127652 A2 | 11/2007 |

OTHER PUBLICATIONS

Li, 'Broadening the Pore Size of Coal-Based Activated Carbon Via Washing-Free Chem-Physical Activation Method for High-Capacity Dye Adsorption' in RCS Advances vol. 8 pp. 14488-14499 (2018). (Year: 2018).*

Khamkeaw, 'Interconnected Micro, Meso, and Macro Porous Activated Carbon from Bacterial Nanocellulose for Superior Adsorption Properties and Effective Catalytic Performance' in Molecules vol. 25, 4063 (2020) (Year: 2020).*

Soylu, et al., Total oxidation of toluene over metal oxides supported on a natural clinoptilolite-type zeolite, Chemical Engineering Journal, May 12, 2010, 380-387, Elsevier.

Zijian Dai, et al., Nanocrystalline $MnO_2$ on an activated carbon fiber for catalytic formaldehyde removal, RSC Advances, Sep. 22, 2016, pp. 97022-97029, Issue 99, The Royal Society of Chemistry 2016, China.

Tang Shu Hui, et al., Potassium Hydroxide Activation of Activated Carbon: a commentary, Carbon Letters, Oct. 31, 2015, pp. 275-280, vol. 16, No. 4, Korean Carbon Society, Korea.

E. Pargoletti, et al., High-performance of bare and Ti-doped x-$MnO_2$ nanoparticles in catalyzing the Oxygen Reduction Reaction, Journal of Power Sources, Jun. 10, 2016, 116-128, Elsevier.

J. Zhao, et al., Highly efficient removal of bivalent heavy metals from aqueous systems by magnetic porous $Fe_3O_4$—$MnO_2$: Adsorption behavior and process study, Chemical Engineering Journal, Jul. 1, 2016, 737-746, Elsevier.

W.-C. Peng, et al., Shape-controlled synthesis of one-dimensional x-$MnO_2$ nanocrystals for organic detection and pollutant degradation, Separation and Purification Technology, Feb. 23, 2016, 15-22, Elsevier.

H. Naderi, et al., Nonlinear response of nano-particles birnessite-type Manganese oxide (y-$MnO_2$), Optik, 2013, 1560-1563, Elsevier.

Zhang, et al., Room-Temperature Oxidation of Formaldehyde by Layered Manganese Oxide: Effect of Water, Environmental Science & Technology, Oct. 1, 2015, 12372-12379, ACS Publications.

Tachimoto, et al., Activated Carbon Application Technology, Maintenance Management and Existing Problems Thereof. Translated by Shangyu Gao. Jul. 31, 2002, pp. 244 and 323, Southeast University Press, Nanjing, China.

Soylu, et al., Total Oxidation of Toluene Over Metal Oxides Supported On A Natural Clinoptilolite-Type Zeolite, Chemical Engineering Journal 162.1, 2010, pp. 380-387, United States.

Li Zhou, et al., Facile In-Situ Synthesis of Manganese Dioxide Nanosheets on Cellulose Fibers and their Application in Oxidative Decomposition of Formaldehyde, journal, Jul. 28, 2011, pp. 16873-16878, 115, ACS Publications, Washington, D.C.

\* cited by examiner

SURFACE-MODIFIED CARBON AND SORBENTS FOR IMPROVED EFFICIENCY IN REMOVAL OF GASEOUS CONTAMINANTS

CROSS-REFERENCES TO RELATED APPLICATIONS

This application is a divisional of U.S. application Ser. No. 15/802,971 filed Nov. 3, 2017, which claims the benefit of U.S. Provisional Application No. 62/416,899 filed Nov. 3, 2016, U.S. Provisional Application No. 62/422,943 filed Nov. 16, 2016, and U.S. Provisional Application No. 62/463,144 filed Feb. 24, 2017. The above prior applications are hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to materials used to remove contaminants from a gas, and more particularly to materials used to remove contaminant gases, such as aldehydes, from air.

Aldehydes are highly reactive organic compounds, and include formaldehyde, acetaldehyde, propionaldehyde, butyraldehyde, benzaldehyde, cinnamaldehyde, tolualdehyde, and retinaldehyde, among others. Formaldehyde is harmful if inhaled by humans at sufficient levels and is considered a volatile organic compound, or VOC. Aldehydes are sometimes found in air around newly manufactured polymers, which are present in residential buildings. It is therefore desirable to remove aldehydes from air in residential buildings.

One common way of removing contaminants from the air in a residential building, such as a house, is to treat a filter used in the central heating and cooling system of the house with materials that will adsorb contaminants from the air as it is circulated through the house. Such heating and cooling systems are known to use a fan to move air into each room of the home while simultaneously drawing air out of most or all of the same rooms. In this manner, air is circulated through the central system and while the filter strains out and/or otherwise removes particulate from the air, the treatment materials adsorb the contaminant gas molecules from the air as the air passes through the filter.

Prior art filters have included activated carbon treated for an adsorptive (physisorption or chemisorption) mechanism to filters used in the central heating and cooling system of building. These filters use carbon in large mesh size or in pellet form to adsorb contaminants, such as formaldehyde. Thus, the prior art removes formaldehyde by carbon treated for adsorptive mechanisms. It is desirable to remove more formaldehyde, or remove formaldehyde at faster rates, in order to reduce the negative impact of formaldehyde on the occupants of any building.

BRIEF SUMMARY OF THE INVENTION

Disclosed herein are activated carbon and other porous sorbents with surface modifications, which may be carried out by impregnation with transition metals, metal oxides and complexes. These surface-modified porous sorbents receive the metal oxides in their pores and may be placed in contact with room air, such as by being added to an HVAC filter. This results in higher adsorption of VOCs, and in catalytic activity in the oxidation of VOCs, and especially formaldehyde, in the air passing through the filter or other air-contacting structure, thereby removing the VOCs from the air stream that will be breathed by the occupants of the building.

Activated carbon is one contemplated porous sorbent, as are titania, molecular sieves, zeolites and alumina. Activated carbon may be impregnated with MnOx-based nano particles, which may be previously prepared or prepared in-situ, to give an additional mechanism of catalytic oxidation of VOCs, such as formaldehyde and other aldehydes. This combination of MnOx nano particles and activated carbon has a higher capacity for oxidation at faster kinetics, which results in higher filtration efficiency and longer filter life. Porous substrates in addition to activated carbon may be impregnated with Manganese-based particles and/or nanoparticles, including, without limitation, zeolite.

Also disclosed herein is a fibrous structure, such as a woven sheet, a non-woven batt, or a web of fibers, which may be polymeric. The fibrous structure may have a coating of metal oxide and ionic suspensions that create catalytic sites on the fibrous structure. This fibrous structure may be placed in a frame and installed as a filter in a central heating and cooling system. It is contemplated to use the resulting filtration media as air filtration media for the oxidation of volatile organic compounds (VOC), especially formaldehyde, in an air stream. This may be accomplished by placing the media in a frame in a duct formed in the air path of a heating, air conditioning and ventilation (HVAC) system of a building, which can be a home, apartment building, office building, factory, or any other structure. The polymeric web coated with catalytic nano metal oxide (e.g., manganese oxide) has enhanced efficiency in the removal of molecular gas and/or VOCs by adsorption and catalysis of the contaminant into less-harmful substances.

A polymeric web media may be coated with nano-sized manganese oxide and potassium ions. The filtration media may be used alone, or in combination with activated carbon, in an HVAC system. The media may be treated with activated carbon impregnated with commercially-available or in-situ-prepared MnOx-based nano particles as described herein to give a mechanism for removing VOCs/gases by catalytic oxidation of VOCs, such as formaldehyde. This results in a higher capacity of removal at faster kinetics, resulting in higher filtration efficiency and longer filter life. Thus, the advantage of this polymeric web coated with nano particles of manganese oxide is that the coated web can decompose more VOCs, and at faster kinetics, to support accomplishing higher CADR and CCM.

The polymeric fibrous structure coated with manganese oxide acts as a strong catalyst for the decomposition and/or oxidation of VOCs (especially formaldehyde) from the air stream into $CO_2$. The web has higher catalytic capacity than prior art structures to remove gaseous contaminants (including formaldehyde vapors and other gases) by using a catalytic coated web alone or in combination with activated carbon in an air filtration system. Also disclosed is technology to synthesize nano manganese oxide particles (MnOx) and coat the polymeric web.

The filtration media disclosed herein adding catalytic activity removes formaldehyde and molecular gases and/or vapors from an air stream. Catalytic activity may be added to a carbon filter by using a polymeric web layer coated with catalytic manganese oxide and potassium ions. Alternatively, or additionally, catalytic activity may be added to a particulate filter by entrapping granular sorbent impregnated with MnOx between two layers or attaching activated carbon with MnOx impregnated therein to a fibrous web. The air filtration media for the gaseous phase may be a combination of a particulate filter web and a carbon filter, which may be carbon in the form of pellets, granules or immobilized carbon in sheet form to react with (and/or adsorb) and thereby remove the gaseous contaminants from the air stream.

The products disclosed herein should meet the emerging standards of air filters in terms of higher filtration efficiency to remove formaldehyde and other Volatile Organic Compounds (VOCs). In particular, the GBT 18801 test protocol introduced by Chinese authorities to remove formaldehyde at higher clean air delivery rate (CADR) is desirably met by the disclosed products.

Disclosed herein is a high filtration media that immobilizes the surface-modified carbon described herein to accomplish the higher adsorption and catalytic activity to remove formaldehyde and other vapors/gases from the air stream.

Figure 1:
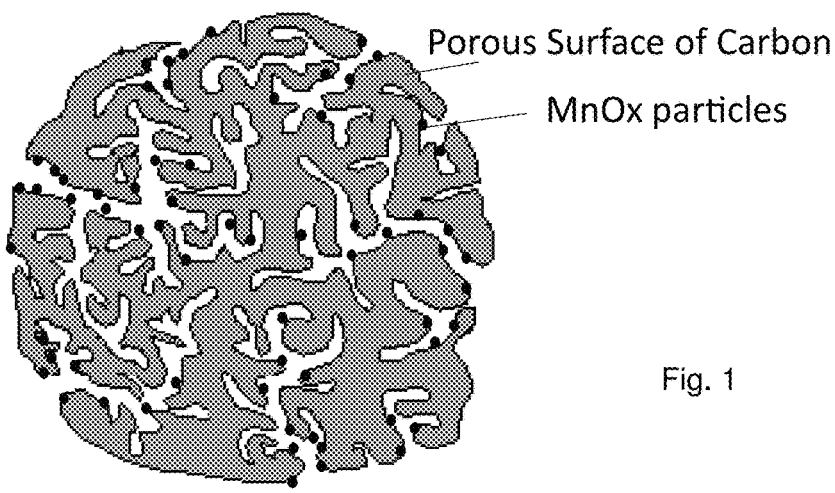
FIG. 1 is a schematic cross-sectional view illustrating a highly porous carbon granule onto which particles of MnOx are dispersed.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 62/416,899 filed Nov. 3, 2016; U.S. Provisional Application No. 62/463,144 filed Feb. 24, 2017; and U.S. Provisional Application No. 62/422,943 filed Nov. 16, 2016 are incorporated into this application by reference.

Activated carbon in any particle size distribution from as coarse as 4 mm to as fine as 10 micron may be treated, such as by being impregnated, with manganese oxide (MnOx) and such complexes prepared as their finely dispersed nano particles. The nanoparticles of MnOx are preferably in the range of 100-400 nanometers.

These nano particles are commercially available and may be applied to the activated carbon or other substrate. Alternatively, the particles may be formed in situ by chemical/reducing agents with their precursors, such as potassium/sodium permanganate, manganese acetate, manganese oxalate and/or manganese sulfate and others known by the person of ordinary skill. One may blend this MnOx impregnated carbon with a proportion (10-60%) of carbon impregnated with ionic alkaline salts, such as KOH and KCl, to increase the activity for the catalytic oxidation.

The resulting MnOx impregnated activated carbon or other substrates have catalytic properties in addition to adsorptive properties. One proposed MnOx impregnated substrate is activated carbon with a concentration of MnOx particles in the range of 0.5-5.0% by weight of the carbon. A proposed impregnated substrate is zeolite with a concentration of MnOx particles in the range of 0.5-2.0% by weight of the zeolite.

To combine the effect of catalytic oxidation of VOCs, such as formaldehyde, with the physisorption and chemisorption of such VOCs, the porous carbon or other substrate is impregnated with manganese oxide and possibly also hydroxides on finer carbon particles and accomplished uniform dispersion of the catalytic sites of manganese crystallites. This MnOx impregnated carbon may be blended with a proportion of ionic alkaline salts (such as KOH and KCl) impregnated carbon to further increase the activity for the catalytic oxidation.

The air filtration media for the gaseous phase may be a combination of particulate filters and carbon filters. Carbon filters may be formed of carbon pellets, granules or immobilized carbon in sheet form, which may have a honeycomb structure to retain the granules.

Surface modification may be carried out on carbon in one or more of the many forms and in a wide range of particle size distribution by wet impregnation with manganese oxide. The manganese oxide may be prepared by dissolving manganese precursor compounds (such as potassium/sodium permanganate, manganese acetate, manganese oxalate and manganese sulfate) with their reducing agents (such as ammonium oxalate, ammonium hydroxide and aniline) in aqueous phase. The manganese oxide particles formed in suspension in the liquid phase are then dispersed in the activated carbon's porous surface by wet process followed by drying at a temperature lower than 150° C.

The reaction rate forming manganese oxide particles affects the particle size. If the precursor and reducing agents are combined rapidly, large particles will precipitate, which is undesirable. However, if the precursor and reducing agents are combined in a controlled manner, for example in diluted form (in water) with the reducing agent deliberately kept at a low concentration to slow the reaction, the particles formed are extremely small, as desired. The carbon with alkaline ionic charges may be prepared by dissolving potassium precursor compounds, such as potassium hydroxide/chloride/iodide, in water. The carbon is impregnated or soaked with this solution for about an hour and then dried in the same way at a temperature lower than 150° C.

The manganese precursor is typically used in the range between 0.5 and 5 wt % of the carbon to be impregnated and prepared using de-ionized water in 1-100% (e.g., 20%) excess of the carbon's incipient volume. Reducing agents like ammonium hydroxide, ammonium oxalate, oleic acid or aniline are used to convert manganese precursors into manganese oxide particles of very small size. Then the carbon is impregnated with this water suspension containing fine manganese oxide nano particles, using a spraying and/or soaking process that evenly spreads the manganese oxide nano particles over the activated carbon.

The alkaline/K+ ionic precursor is typically used in the range between 0.5 and 10 wt % of the carbon and prepared using de-ionized water in 1-100% excess of the carbon's incipient volume, as above.

In one method, commercially available manganese oxide ($MnO_4$) powder was purchased and 1.0 g of the $MnO_4$ powder was suspended in 100 ml of water. This suspension was then sprayed on 100 g of commercially available activated carbon and dried. The CADR test results for this carbon was similar to that of MnOx Carbon produced in the method described below.

In another method, 1.0 g of potassium permanganate or manganese acetate was dissolved in 120 ml of water. A few drops of ammonium hydroxide or oxalate solution (which solution is a dilution of 50.0 g in 500 ml of water) were added and the combination was shaken for 30 minutes to form manganese oxide nano particles in suspension in the liquid. Then 100.0 g of activated carbon particles in the herein-referenced size range was sprayed with this suspension and allowed to soak for 30 minutes. Finally, the carbon was dried at low temperature (less than 150° C.) until the final moisture content in the carbon was less than about 1% by the weight of carbon, which took about 20-24 hours.

The described carbon impregnated with manganese oxide has both adsorptive as well as catalytic properties to remove VOCs, especially formaldehyde, from the air stream. The manganese oxide is prepared in fine particles by a wet process and dispersed in the pores of activated carbon granules. The formaldehyde (HCHO) molecules are adsorbed and react with the catalytic MnOx particles and are oxidized to $CO_2$ and $H_2O$, by the mechanism proposed below:

$$HCHO + O_2 \rightarrow CO_2 + H_2O$$

The surface modified carbon, loaded with such manganese oxide, acts as a strong catalyst for the decomposition/oxidation of formaldehyde into $CO_2$ and the decomposition and/or oxidation of other VOCs. Furthermore, the material acts as a high efficiency sorbent to adsorb such organic gaseous molecules by physisorption and chemisorption in the gas phase filtration.

The resulting form of the surface modified carbon loaded with MnOx (e.g., $MnO_2$ and other manganese oxides) is sketched in FIG. 1. It can be seen by the schematic of FIG. 1 that MnOx particles are widely and evenly distributed within the pores of the porous substrate granule, and on or toward the outer surface thereof. At the concentrations stated herein, such MnOx particles on the carbon substrate have catalytic properties in addition to adsorptive properties. These MnOx particles may be mounted in a filter to remove formaldehyde and other VOCs from ambient air that is flowing through the filter that is mounted in a conventional HVAC system or a room or building filtration device. The catalyzation of formaldehyde oxidizes the harmful chemical into much less harmful $CO_2$ and $H_2O$. The adsorptive feature removes the VOC from the air by adsorption. This combination arises due to the surface area per unit mass of the extremely small particles of MnOx. As an example, the MnOx particles may be in the range of 100-400 nanometers in size. The activated carbon also has a high surface area per unit mass, and may be in the range of 800-1,300 $m^2/g$. The preferred activated carbon has a surface area of about 1,000 $m^2/g$.

One advantage of the resulting carbon is that it can decompose more VOCs, and at faster kinetics, than other products due to the combination of adsorptive and catalytic activities. Another advantage is that the carbon can be in any size particles from coarser to finer mesh sizes. Moreover, the carbon can be immobilized, such as between two layers, in a nonwoven filtration media to impart these benefits in the given space of a filter.

Figure 2:
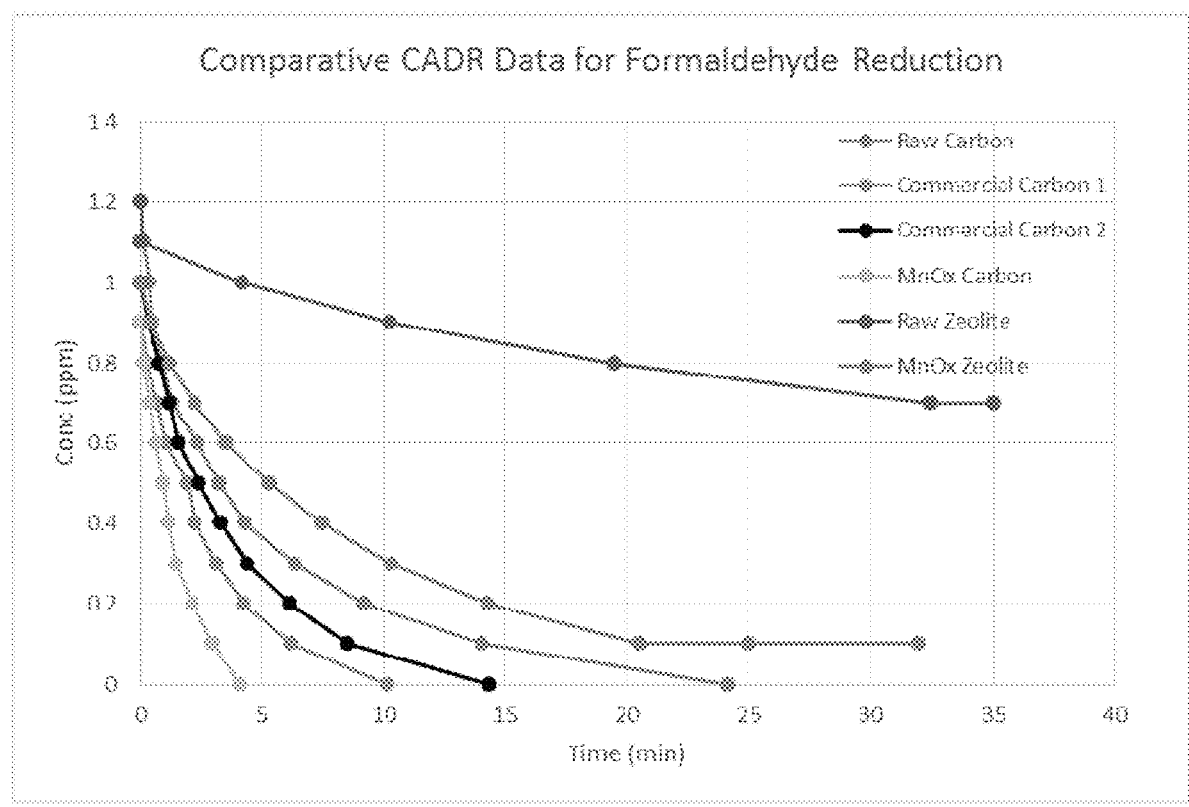
FIG. 2 is a graphical representation of experimental data resulting from an experiment in which the amount of time required for multiple different substances to remove formaldehyde from a volume of air.

In order to support the increase in efficiency by catalytic oxidation, Applicant compared the formaldehyde CADR of different carbon and zeolite samples. The results are shown in FIG. 2. In the test, a 1 $m^3$ chamber was filled with ~1.2 ppm of formaldehyde using a VOC generator and allowed to naturally decay for half an hour. During this time, the temperature was maintained at 22° C. and the relative humidity at about 50%. Once the concentration was stabilized, an air purification device in the chamber was turned on and the time versus concentrations were recorded until the chamber was completely cleaned of formaldehyde. The results show that a product made according to the invention removed the formaldehyde faster than either type of commercially available carbon alone. It can be further seen that the surface modified Carbon and Zeolite show significantly higher efficiency (CADR) in cleaning the chamber as compared to those untreated (raw) Carbon and Zeolite.

The invention differs from the prior art by the existence of nano manganese oxide particles (MnOx) dispersed in carbon or other sorbent substrate pores to result in the specific morphology and properties of the combination. This results in adsorption and catalytic activity to remove gaseous contaminants including formaldehyde vapors and other gases.

The combination of MnOx impregnated in carbon and blended with a proportion of ionic alkaline salts (such as KOH and KCl) impregnated in other carbon particles further increases the activity for catalytic oxidation. The structural integrity of the media and its formulation with treated carbon and binder is significant. The invention contemplates including a proportion of the surface-modified sorbents in addition to carbon, such as titania, molecular sieves, zeolites and alumina to result in synergy to give even higher performance. In existing honeycomb filters, it is contemplated to coat the structure with this catalytic carbon so that there are two VOC-removing mechanisms operating: catalysis by the catalytic carbon and adsorption by the carbon in the honeycomb filter.

A method of preparing MnOx particles in aqueous phase may begin with manganese precursors, such as potassium permanganate or manganese acetate or manganese sulfate, and results in impregnating carbon particles with these finely suspended MnOx particles. The starting carbon particle size can be as coarse as 4 mm to as fine as 10 micron with high micro-porosity and textural properties. Due to the uniform dispersion of the fine catalytic MnOx particles on the carbon, resulting filters have higher life at higher filtration efficiency of gaseous contaminants.

The above-described compound impregnates activated carbon with an in-situ-prepared nano manganese oxide (nMnOx) particles suspension which imparts the catalytic properties to decompose various gaseous molecules, such as formaldehyde. It is known that formaldehyde is a basic compound in the class of "Aldehyde" compounds. Another such compound is acetaldehyde which has similar properties and is considered to be an equally or more toxic air pollutant. The same nMnOx impregnated carbon may remove acetaldehyde as well as formaldehyde, by catalytic oxidation. It is in this context that the product is extended to the catalytic oxidation of VOCs such as the aldehyde group of compounds, which include formaldehyde and acetaldehyde.

Disclosed herein is a surface modification of activated carbon and other porous sorbents by wet impregnation with transition metals and metal oxides, especially manganese oxide. The activated carbon granules can be any mesh size and any form, but preferably is in the ranges of 4-8 mm, 8-16 mm, 20-50 mm and 50-200 mm U.S. mesh size. If zeolite is used, the preferred size is 12-30 mm mesh size. Activated carbon pellets may be used in the range of 2-3 mm in size. This MnOx impregnated carbon may be blended with another carbon impregnated with ionic alkaline salts like KOH and KCl to increase the activity for the catalytic oxidation.

An objective is to remove the gaseous species from the air stream by higher adsorption and catalysis by the activated carbon. The said higher adsorption and catalytic activity can be created by different chemical treatments and impregnation with active metal/oxides. By the chemical treatments we create different functional groups on the carbon basal plane, which are considered to be the chemisorption active sites. These sites are occupied by the gaseous molecules to form a bond between a functional group and the gas molecules and gradually become saturated. In other words, the chemically-treated carbon (e.g., activated carbon with potassium ions) has limited capacity for chemisorption to remove the gaseous species. However, the catalytic carbon prepared by the explained method of impregnation with nMnOx particles has the capability to decompose the gaseous molecules and the remaining active sites are regenerated after every cycle.

Figure 3:
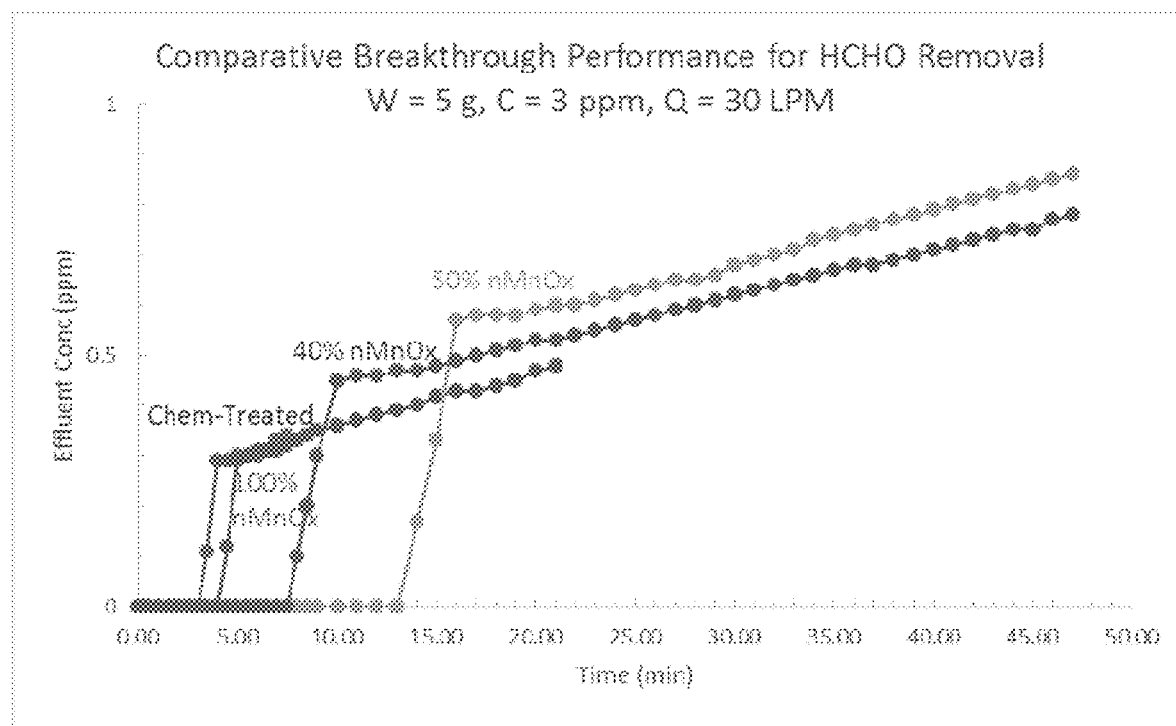
FIG. 3 is a graphical representation of experimental data resulting from an experiment in which the time for breakthrough of a filter by contaminants is shown for each of four samples.

It is contemplated to combine the chemisorption and catalytic mechanisms to remove gases. Two approaches are contemplated. A first approach is to physically blend the two carbons: the chemically-treated carbon and nMnOx-impregnated catalytic carbons can be mixed in various proportions to combine the effects. It is observed that the formaldehyde and other gaseous removal efficiency increases significantly by blending the chemisorption and catalytic carbons. The effects add up significantly, as can be seen in FIG. 3, which shows the results of experiments to determine formaldehyde breakthrough and saturation capacity of various blends. The shortest breakthrough time is by catalytic nMnOx carbon alone, the next shortest time is by chemically treated carbon alone. The longest time to breakthrough, which signifies the best product in this regard, is the physical blend in 50/50 mixture of carbon impregnated with nMnOx and carbon chemically-treated with ionic alkaline salts, such as potassium ions (e.g., KCl, KOH, KI). The second highest time is the blend of 40% carbon impregnated with nMnOx and 60% carbon chemically-treated with ionic alkaline salts. The longest time until breakthrough of contaminants is thus found in the blend of 50% activated carbon impregnated with nMnOx and 50% carbon chemically-treated with ionic alkaline salts.

The second approach is to create dual effects of chemisorption and catalysis on the same carbon by impregnating first with catalytic manganese oxide and then treating with chemical reagents. The first step of preparing nMnOx carbon is explained herein. The second treatment is carried out on the same carbon. For this, the chemical reagents like KI, KOH, etc., are dissolved in water in the 10-25% volume of the carbon to be treated and then sprayed uniformly on the nMnOx carbon.

Another embodiment may be created by coating polymeric fibrous structures with the same manganese oxide particles and potassium ions described herein to give additional catalytic activity in the air filters for oxidizing VOCs, when in use individually or in combination with carbon filters described herein. One may prepare MnOx particles in aqueous phase (starting with manganese precursors such as potassium permanganate, manganese acetate, or manganese sulfate) and impregnate carbon with these finely suspended MnOx particles. The next step is to coat the MnOx particles on the polymeric web to accomplish the higher CADR and CCM for removing molecular gas contaminants/VOCs from the air stream. In the first step, the manganese precursor compound is dissolved in water in the range between 1 and 30% w/v, the potassium ion precursor is dissolved in the range between 10 and 30% w/v for the coating on the fibers. In the second step, the nano manganese oxide loading is 1-5%.

Figure 4:
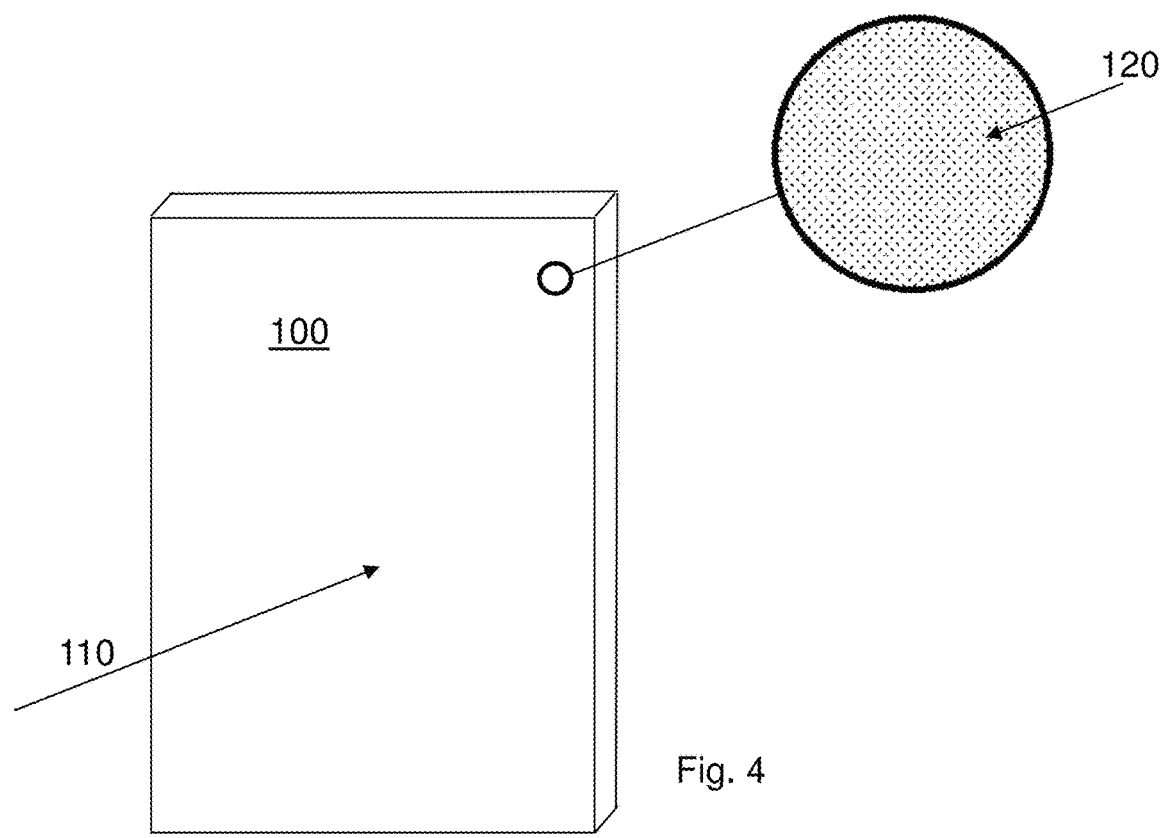
FIG. 4 is a schematic side view illustrating an embodiment of the invention.
Figures 5, 6:
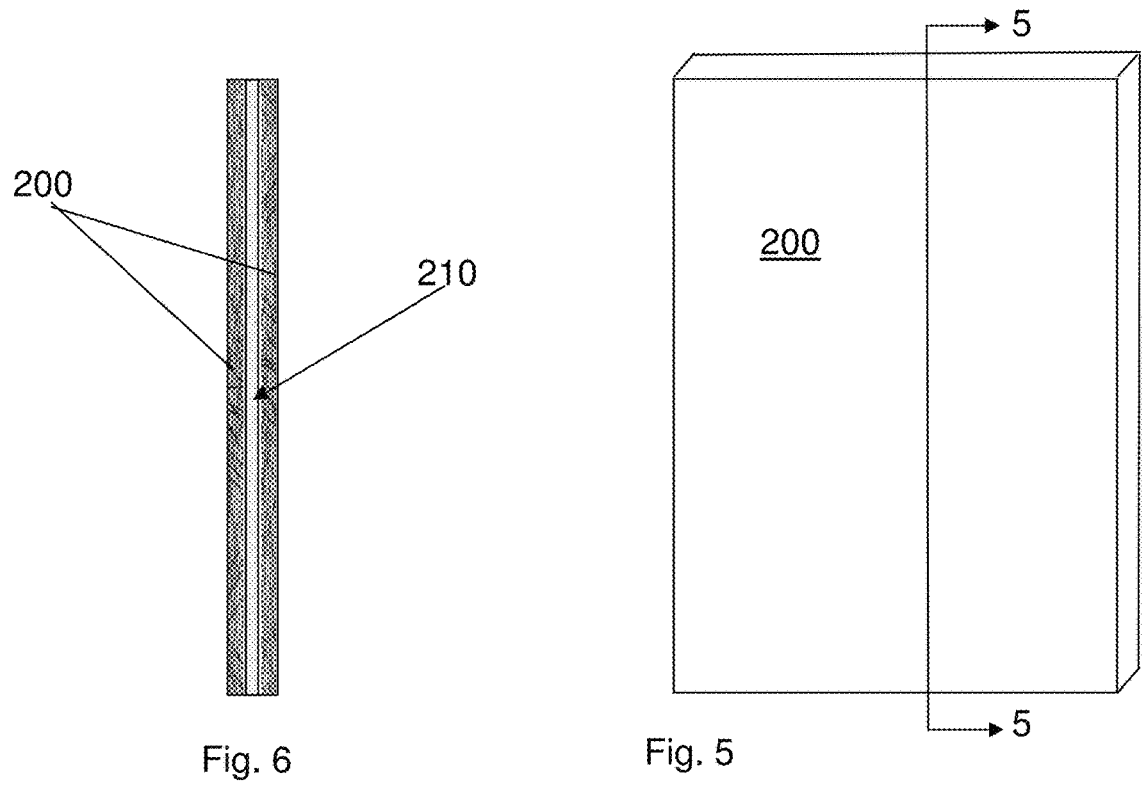
FIG. 5 is a schematic side view illustrating an embodiment of the invention.
FIG. 6 is a schematic end view in section illustrating the embodiment of the invention of FIG. 5 through the line 5-5.
Figure 8:
FIG. 8 is a schematic end view in section illustrating the embodiment of the invention of FIG. 7 through the line 8-8.
Figure 7:
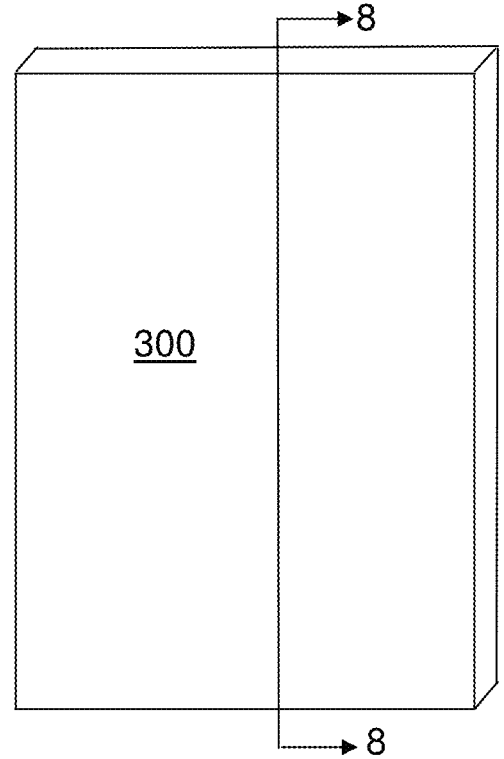
FIG. 7 is a schematic side view illustrating an embodiment of the invention.

The product resulting from coating fibers with impregnated carbon is shown schematically in FIG. 4, in which a filter media, such as a non-woven batt 100, is placed in a stream of gas flow 110. A magnified view of the media shows the porous sorbent particles 120 in the non-woven batt 100. The particle 120 may be impregnated with MnOx, treated with potassium ions, both, or a combination of some impregnated and some treated. In an alternative embodiment shown in FIGS. 5 and 6, a batt 200 of fibrous media has interposed within it a sheet or panel 210 of material in which the impregnated carbon particles are retained. The panel 210 may be two sheets of woven or non-woven, gas-permeable material. Thus, the batt 200 filters particulate while the impregnated carbon particles retained in the panel 210 catalyze the conversion of VOCs and adsorb the same, thereby removing the VOC from the gas passing through the media batt 200. Another alternative embodiment is shown in FIGS. 7 and 8, in which a media batt 300, which may be polymer fibers formed in a non-woven structure, has had porous, sorbent particles adhered to the fibers of the batt 300. The sorbent particles are impregnated with metal oxide nano particles according to the disclosure herein, and some sorbent particles may be treated by ionic alkaline salts.

Due to the uniform coating of these catalytic MnOx particles on the polymeric layers, such media has longer life at higher filtration efficiency of gaseous contaminants when used in combination with activated carbon filters described herein. Thus, it is contemplated to create a polymeric, non-woven web of fibers that is coated with catalytic manganese oxide and potassium ions. This web of fibers may be used individually, or in combination with carbon filters, in the air filtration media.

The manganese oxide coating may be prepared in multiple steps, starting with coating the fibrous structure with a colloidal solution of manganese compounds, such as potassium/sodium permanganate. These may be the same as the precursors used in formation of MnOx nano particles that coat the activated carbon granules as described herein. The nano manganese oxide particles are applied to the resulting web structure, such as by applying the suspension of MnOx nano particles to the web structure. The metal oxide complex solution is thus prepared with manganese oxide (MnOx) using chemical/reducing agents with their precursors as potassium/sodium permanganate or manganese acetate or manganese sulfate, and the nano manganese oxide particles that were prepared in aqueous form coat the polymeric fibers or web.

The manganese oxide may be prepared by dissolving manganese precursor compounds such as potassium permanganate, manganese acetate and manganese sulfate and their redox reactions with chemicals agents including ammonium oxalate, ammonium hydroxide and aniline in aqueous phase, as described herein.

Polymeric fibrous structures with different concentrations of MnOx particles in different concentrations start with manganese precursors, such as potassium permanganate, manganese acetate, or manganese sulfate. This nano manganese oxide coated fibrous web may be coated in conventional honeycomb filters to synergize the catalytic activity.

The manganese oxide precursor may be applied to the fibers when the precursor is diluted in water or some other liquid. The manganese oxide nano particles may be applied to the fibers by applying the suspension described above to the fibers. The manganese oxide precursor on the fibers may have some effect of catalyzing VOCs, and the manganese oxide nano particles also on the fibers may have some effect of catalyzing VOCs. The catalyzing effect of a resulting product can be enhanced by adding to the fibers so coated (with manganese oxide precursor and manganese oxide nano particles) an activated carbon filter which may be as shown in U.S. Pat. No. 9,199,189 and/or United States Patent Application Publication No. 2016/0023186, both of which are incorporated herein by reference.

Figure 9:
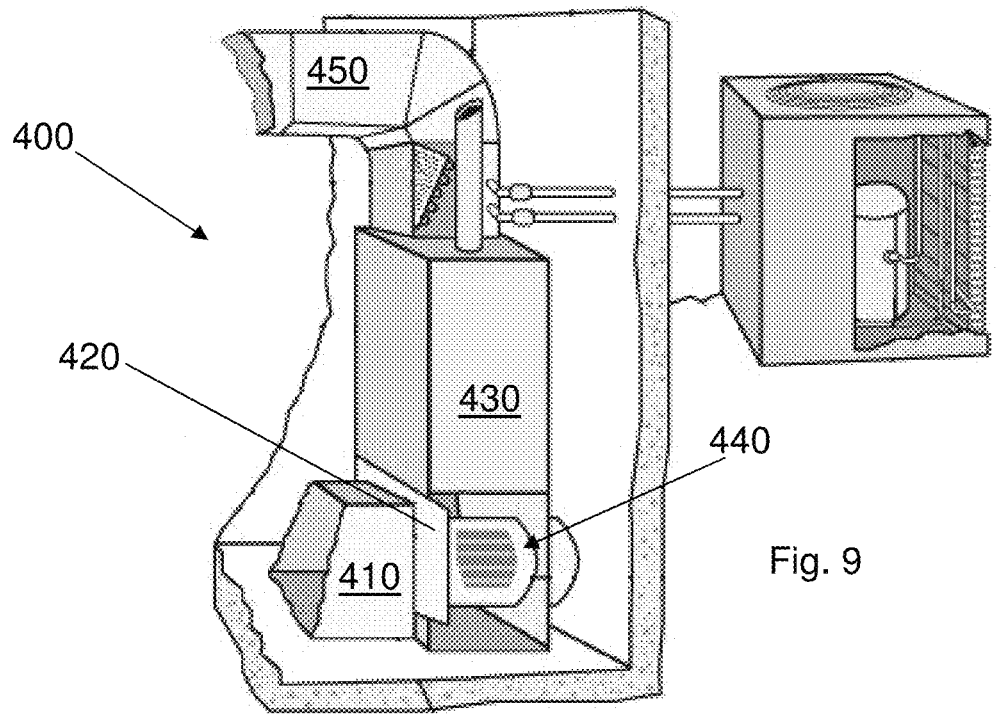
FIG. 9 is a schematic illustration of a heating, ventilation and cooling system with an embodiment of the invention in place therein.

An embodiment of the invention is shown positioned in a conventional heating, ventilation and cooling (HVAC) system 400 in FIG. 9. The HVAC system 400 holds a filter 420 adjacent an air handling furnace 430, in which a blower fan 440 draws air through an air return 410 from rooms in a building, through the filter 420, through the air handling furnace 430 and out a supply 450 to rooms of the building. Any filter described herein, and any filter media or additive to media or a filter, may be positioned where the filter 420 is located as shown in FIG. 9. Air, or any other gas, thereby flows through the filter 420 and VOCs, such as formaldehyde, is catalyzed in a reaction to $H_2O$ and $CO_2$, and adsorbs to, the additives described herein.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of forming a material for reacting with volatile organic compounds in a flow of gas, the method comprising:
    (a) reacting at least one manganese precursor compound with a reducing agent of the at least one manganese precursor in aqueous phase to form metal oxide nanoparticles;
    (b) depositing at least some of the metal oxide nanoparticles in a first porous sorbent having outer surfaces with pores extending internally to define passages, wherein the at least some of the metal oxide nanoparticles deposited in the first porous sorbent are disposed in at least some of the pores and some of the passages: and
    (c) applying at least some of the metal oxide nanoparticles to a polymeric fibrous structure.

2. The method in accordance with claim 1, wherein the step of depositing comprises combining the aqueous phase solution and the first porous sorbent and then drying the combination at a temperature lower than 150 degrees Celsius.

3. The method in accordance with claim 2, wherein the step of depositing comprises spraying the aqueous phase solution on the first porous sorbent.

4. The method in accordance with claim 2, wherein the step of depositing comprises soaking the first porous sorbent in the aqueous phase solution.

5. The method in accordance with claim 1, wherein the step of reacting further comprises combining the manganese precursor compound with its reducing agent in aqueous phase and shaking the combination.

6. The method in accordance with claim 1, wherein the step of reacting further comprises combining a manganese precursor with a reducing agent of the at least one manganese precursor in the range of about 0.5-5.0 weight percent of the first porous sorbent.

7. The method in accordance with claim 1, whereby the precursor and the reducing agent are combined with the reducing agent maintained at a concentration that slows the reaction between the precursor and the reducing agent sufficiently to form nanoparticles within a size range of about 100 to about 400 nanometers.

8. The method in accordance with claim 1, further comprising blending the first porous sorbent constituting about 40-50% by weight with a second porous sorbent constituting about 50-60% by weight, wherein the second porous sorbent is impregnated with ionic alkaline salts in at least pores formed on an outer surface of the second porous sorbent, after step (b).

9. The method in accordance with claim 1, wherein the step of applying comprises coating the metal oxide nanoparticles on the polymeric fibrous structure.

10. The method in accordance with claim 1, wherein the step of applying comprises retaining at least some of the first porous sorbent in a sheet of material that is interposed within the polymeric fibrous structure.

11. The method in accordance with claim 1, wherein the step of applying comprises adhering at least some of the first porous sorbent to the polymeric fibrous structure.

* * * * *